United States Patent [19]

Rosansky et al.

[11] Patent Number: 4,482,615
[45] Date of Patent: Nov. 13, 1984

[54] LITHIUM ANODE COMPRISING COPPER STRIP IN CONTACT WITH LITHIUM BODY AND LITHIUM-SULFUR DIOXIDE BATTERY UTILIZING SAME

[75] Inventors: Martin G. Rosansky, Montvale, N.J.; Bruce Jagid, Monsey, N.Y.

[73] Assignee: Power Conversion, Inc., Elmwood Park, N.J.

[21] Appl. No.: 518,035

[22] Filed: Aug. 1, 1983

Related U.S. Application Data

[63] Continuation-in-part of Ser. No. 430,691, Sep. 30, 1982, abandoned.

[51] Int. Cl.³ .......................... H01M 4/02; H01M 6/10
[52] U.S. Cl. ........................................ 429/94; 429/211
[58] Field of Search .......................... 429/94, 101, 211

[56] References Cited

U.S. PATENT DOCUMENTS

| 4,184,012 | 1/1980 | Barrella | 429/94 |
| 4,335,191 | 6/1982 | Peled | 429/94 |
| 4,385,101 | 5/1983 | Catanzarite | 429/94 |

Primary Examiner—Donald L. Walton
Attorney, Agent, or Firm—A. W. Breiner

[57] ABSTRACT

A lithium anode comprising in contact therewith a copper strip extending the substantial length of said anode for utilization in a lithium-sulfur dioxide cell. The copper strip provides a convenient means for fabrication of a lithium-sulfur dioxide coulombically balanced cell as herein defined, and prevents detrimental effects such as bulging, venting, or explosion of the cell when the cell is subjected to forced discharge.

8 Claims, 6 Drawing Figures

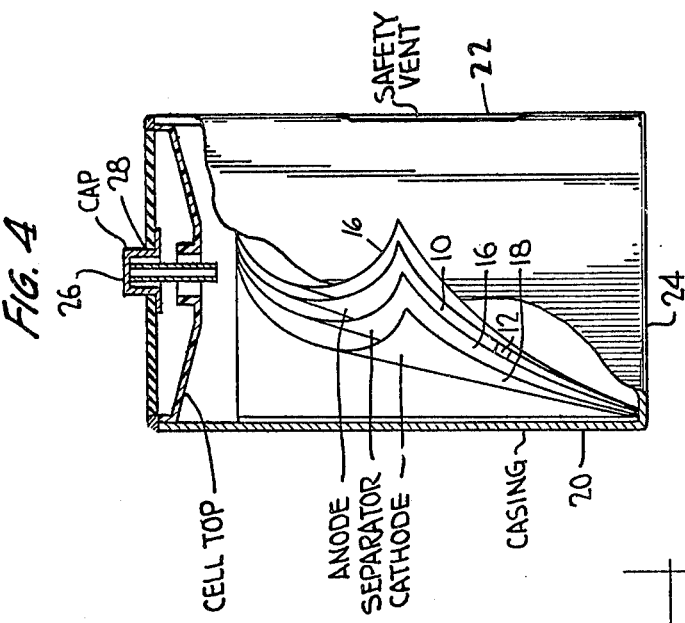
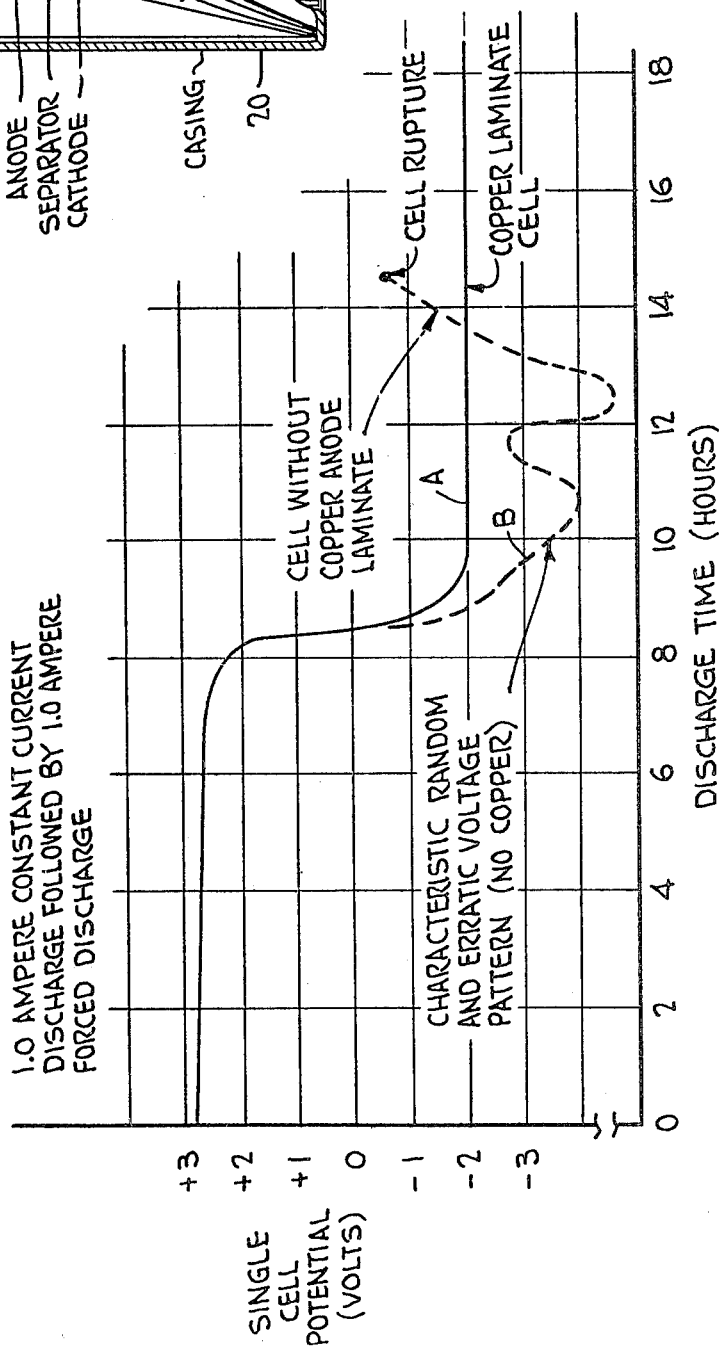

LITHIUM ANODE COMPRISING COPPER STRIP IN CONTACT WITH LITHIUM BODY AND LITHIUM-SULFUR DIOXIDE BATTERY UTILIZING SAME

This is a continuation-in-part of application Ser. No. 430,691 filed Sept. 30, 1982 now abandoned.

This invention relates to a lithium-sulfur dioxide cell and, more particularly, to a lithium-sulfur dioxide cell which when subjected to forced discharge is not detrimentally affected.

The potential advantages of lithium batteries has long been recognized in the battery art. Specifically, it was known that the metal lithium offers the highest energy density theoretically possible in that it has the highest electrode potential of all elements—3.045 volts; it is the lightest metallic element having an atomic weight of 6.94 and a density of 0.538 grams per cubic centimeter, and it has a theoretical electrochemical equivalent of 1751 ampere hours per pound. However, due to the substantial problems posed by the unique characteristics of lithium, it was not until about 1970 that the lithium battery became generally recognized. The best known lithium battery is the lithium-sulfur dioxide system consisting of a lithium anode, a carbon-based cathode, a separator, and a sulfur-dioxide rich organic electrolyte. The basic electrochemical reactions of the lithium-sulfur dioxide system are as follows:

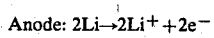
Anode: $2Li \rightarrow 2Li^+ + 2e^-$

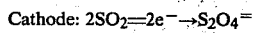
Cathode: $2SO_2 = 2e^- \rightarrow S_2O_4^=$

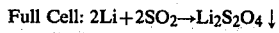
Full Cell: $2Li + 2SO_2 \rightarrow Li_2S_2O_4 \downarrow$

The lithium compound (dithianide) formed during discharge is insoluble in the electrolyte and precipitates at the cathode. The entire system is stable, has good shelf-life, is safe, and is economical. For example, the cell can operate at voltages of 2.8 volts per cell, approximately double the operating voltage of conventional cells, and delivers the highest energy per unit weight and volume of any conventional battery. For example, at a 1 ampere drain, at 70° F., the energy delivered from a single D-size cell is equivalent to 4 mercury-zinc, 5 alkaline-manganese, or 30 carbon-zinc cells. Additionally, the cells can operate at temperatures of from −65° F. to +165° F. over a period of up to five or more years.

Although the lithium-sulfur dioxide cell is unique and highly advantageous, under certain discharge conditions—particularly forced discharge into reverse (negative) voltage—the cell can undergo secondary electrochemical and chemical reactions including violent or explosive reactions. In view of these reactions it has become commonplace to include a safety vent in the cell housing to preclude the cell from bulging, venting, or possible explosion. Although the safety vents are an effective remedy to explosions, venting of a cell in certain environments of uses can be disadvantageous if only from the standpoint of the effect of such venting on the cell user.

Accordingly, it is a primary object of the present invention to provide an improved lithium-sulfur dioxide cell, both primary and secondary, which can be safely discharged including forced discharge into reverse (negative) voltage without generation of chemical species which may subsequently result in cell bulging, venting, or possible explosion.

It is another object of the present invention to provide a lithium-sulfur dioxide "balanced" cell which has a coulombic ratio of lithium to sulfur dioxide of 1.0 plus or minus 0.10 calculated on the total ingredients used in the cell fabrication which is not detrimentally affected by fragmentation of the lithium anode during deep or forced cell discharge.

These and other objects of the invention will become more readily apparent from the following detailed description and particularly the preferred embodiment which is exemplified by the drawing wherein FIG. 1 is a plan view of an anode of this invention including an electrical terminal tab attached thereto;

FIG. 4 is a view partly in section and partly exploded of the lithium-sulfur dioxide cell;

FIG. 5 is a graph showing the discharge curve for a cell utilizing the lithium anode of the present invention and the discharge curve of a cell utilizing a prior art lithium anode.

Figure 1:
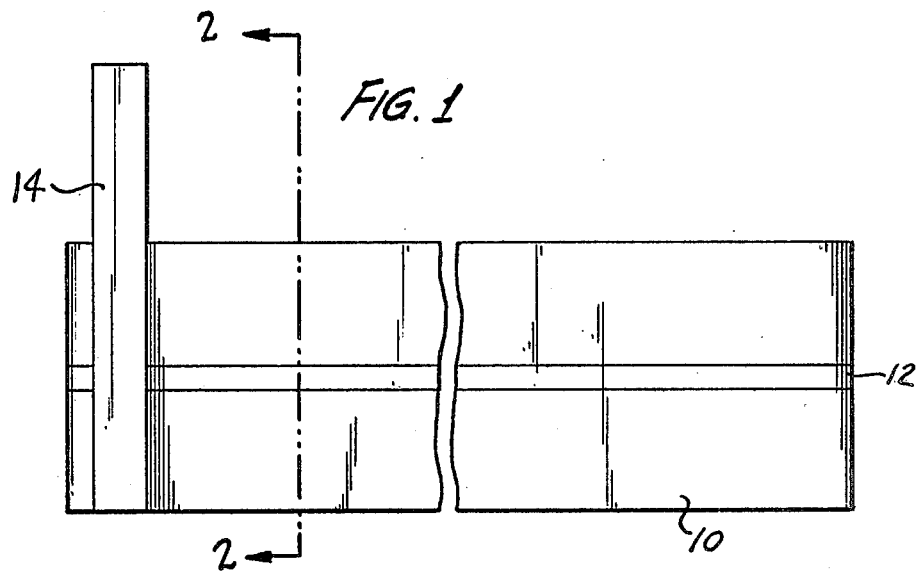
Figure 2:
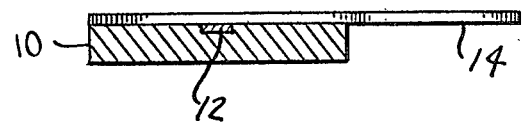
FIG. 2 is a section taken through line 2—2 of FIG. 1.
Figure 3:
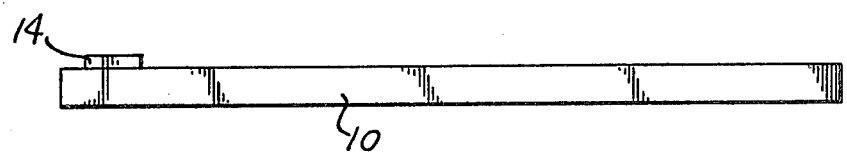
FIG. 3 is a side view of the anode of FIG. 1.
Figure 6:
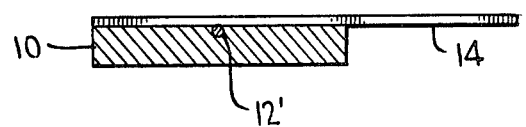
FIG. 6 is a sectional view similar to the view of FIG. 2, but of a modified design.

Referring to FIGS. 1 and 3, a lithium anode 10 has inlaid into the lithium body a copper alloy strip 12 which is oxygen-free and has high conductivity. The ratio of copper area to lithium area computed for the anode face to which the copper has been laminated is 0.1. In order to minimize breakage of the copper anode strip during prolonged periods or forced discharge, the ratio of copper area to lithium area computed for the anode face to which the copper has been laminated should not be less than 0.075, and preferably is at least 0.1 in the event a flat or tape-like strip as shown in FIG. 2 is employed. However, if the copper anode strip is in the form of a wire as shown in FIG. 6, the ratio of copper area to lithium area can be as low as 0.02. The ratio can be as large as 0.25 without detrimentally affecting the performance or the discharge characteristics of the lithium anode. The ratio of copper area to lithium area as above computed can be larger as the thickness of the lithium body becomes greater.

The anode 10 includes, in addition to copper alloy strip 12, a terminal tab 14 which can be of any highly conductive metal, but preferably is copper.

The anode fabricated according to the present invention preferably is employed in a rolled lithium-sulfur dioxide cell as shown in FIG. 4 wherein the components of the cell, i.e., the anode 10, the cathode 18, and a separator 16 between the anode and cathode, are constructed as strips and the components then rolled for assembly into a cell casing 20 having a safety vent 22. The gaseous sulfur dioxide electrolyte is injected into the cell casing after the components are in place. The bottom of the cell housing 24 forms the negative terminal of the cell, and a cap 26 is inserted into the top of the cell which is the positive terminal. The components are suitably sealed, for example with a glass metal seal 28, so as to prevent escape of the sulfur dioxide gas. As shown in FIG. 4, the anode 10 in the form of a strip is separated from the carbon cathode 18 by separator 16. However, because of the rolled configuration of the anode and cathode, both faces of the lithium anode contact the carbon cathode through the separator; and, accordingly, in spite of copper strip 12, all of the lithium of the anode is available for consumption. This configuration, therefore, is ideally suited to provide a coulombic balance between the lithium of the cell and the sulfur dioxide electrolyte. The coulombic balance permits a total discharge and utilization of the lithium during the life of the cell, providing not only economic utilization of the anode materials but also prevents possible hazards when the cell is disposed of.

FIG. 5, in chart form, sets forth the superior performance characteristics of the presently defined sulfur dioxide system when subjected to forced discharge. As seen from curve A, a cell utilizing the lithium anode of the present invention, at a constant rate of 1 ampere, has excellent voltage stability and permits the cell to be forced into voltage reversal for prolonged periods of time without adverse effects. In contradistinction, a cell not utilizing a lithium anode employing the copper strip of the present invention, when subjected to the same discharge characteristics, has erratic stability under forced discharge conditions which can result in bulging, venting, and even possible cell rupture.

Although is it not completely clear how the copper strip accomplishes the stated objectives, it appears, based on analysis of a discharged cell, that the copper of the copper strip enters into a chemical and/or electrochemical reaction with the chemical species released during the primary cell reaction under the forced discharge conditions. Qualitative analysis on discharged cells has evidenced the existence of electrochemical reactions which have resulted in the deposition of copper into the pores of the carbonaceous cathode, thereby eliminating from further reaction the "free" chemical species for reactions which may provide cell bulging, venting, or possible explosion.

As will be apparent to one skilled in the art, various modifications can be made within the scope of the aforesaid description. Such modifications being within the ability of one skilled in the art form a part of the present invention and are embraced by the appended claims.

It is claimed:
1. A lithium anode for utilization in a lithium cell comprising a lithium body having inlaid in one face thereof, a copper strip extending the substantial full length of said lithium body, the ratio of copper area contributed by said copper strip to the lithium area of the lithium body, computed for the anode face to which the copper strip is inlaid, being from about 0.02 to 0.25.

2. The anode of claim 1 wherein the ratio of copper area to lithium area is from about 0.1 to 0.175.

3. The anode of claim 2 wherein the lithium body is in the form of a thin lithium element and said copper strip is in the form of a wire inlaid into one face of said lithium body.

4. The anode of claim 3 including a conductive terminal tab extending across said lithium body and in contact with said copper strip.

5. A lithium-sulfur dioxide cell comprising a casing; a top and bottom; said top forming a positive terminal for said cell and said bottom forming a negative terminal for said cell; within said casing a lithium anode, a carbon cathode, and a separator material separating said anode and cathode in rolled configuration; said lithium anode having inlaid in one face thereof a copper strip extending the substantial length of said lithium anode, the ratio of copper area of said copper strip to the lithium area computed for the anode face to which the copper is inlaid being from about 0.02 to about 0.25, and a gaseous sulfur dioxide electrolyte in said cell, said cell being hermetically sealed.

6. The cell of claim 5 wherein said ratio of copper area to lithium area is from about 0.1 to about 0.175.

7. The cell of claim 6 wherein said copper strip is in the form of a wire.

8. The cell of claim 5 wherein the coulombic ratio of lithium to sulfur dioxide is 1.0 plus or minus 0.10 calculated on the total ingredients used in the cell fabrication.